United States Patent [19]

Jackson et al.

[11] 4,134,815

[45] Jan. 16, 1979

[54] AMPHOTERIC COMPOSITE RESINS AND METHOD OF PREPARING SAME BY POLYMERIZATION OF A TWO-PHASE DISPERSION OF MONOMERS

[75] Inventors: Mervyn B. Jackson, Brunswick; Brian A. Bolto, Mitcham, both of Australia

[73] Assignees: ICI Australia Limited; Commonwealth Scientific and Industrial Research Organization, both of Melbourne, Australia

[21] Appl. No.: 798,884

[22] Filed: May 20, 1977

[30] Foreign Application Priority Data

May 31, 1976 [AU] Australia .............................. PC/6110
Jul. 16, 1976 [AU] Australia .............................. PC/6675

[51] Int. Cl.² ........................... C08F 2/48; C08F 2/18; C08F 2/20; C08F 8/00
[52] U.S. Cl. ........................ 204/159.22; 204/159.23; 521/31; 526/72; 526/207; 526/209; 526/213; 526/913
[58] Field of Search ........................ 260/2.1 M, 2.1 R; 204/159.22, 159.23

[56] References Cited

U.S. PATENT DOCUMENTS

| | | | |
|---|---|---|---|
| 3,957,698 | 5/1976 | Hatch | 260/2.1 R |
| 3,991,017 | 11/1976 | Barrett et al. | 260/2.1 R |

*Primary Examiner*—Stanford M. Levin
*Attorney, Agent, or Firm*—Cushman, Darby & Cushman

[57] ABSTRACT

A process of manufacturing an amphoteric composite resin which process comprises first polymerizing a dispersion comprising two liquid phases wherein the first liquid phase comprises at least one monomer containing a basic group or a precursor or derivative thereof and a crosslinking agent, and the second liquid phase comprises at least one monomer containing an acidic group or a precursor or derivative thereof and a crosslinking agent, and wherein the monomers are not of opposite charge, the two liquid phases are substantially immiscible and partitioning of the monomers from one liquid phase to the other is minimal, to form a composite polymeric material; and second treating the composite polymeric material to convert any acidic group precursor or derivative and any basic group precursor or derivative to the free acid and free base respectively to form an amphoteric composite resin.

18 Claims, No Drawings

AMPHOTERIC COMPOSITE RESINS AND METHOD OF PREPARING SAME BY POLYMERIZATION OF A TWO-PHASE DISPERSION OF MONOMERS

This invention relates to thermally regenerable ion-exchange resins and in particular to amphoteric composite resins.

Amphoteric ion-exchange resins have an important application in water demineralization processes using thermal regeneration, as described in the publications:

"An Ion Exchange Process with Thermal Regeneration," J. Inst. Engr. Aust. (1965) 37, 193 (Part 1); Aust. J. Chem. (1966) 19, 561 (Part II), 589 (Part III), 765 (Part IV) and 791 (Part V); Aust. J. Chem. (1968) 21, 2703 (Part VI); Desalination (1970) 8, 21 (Part VII); Desalination (1973) 12, 217 (Part VIII); Desalination (1973) 13, 269 (Part IX); Australian Patent Specification No. 274,029.

Resins having a useful thermally regenerable ion-exchange capacity are those of the weakly acidic and weakly basic type. However, mixtures of them have such inherently slow rates of salt uptake that their use in conventional mixed-bed systems is impractical for large-scale water treatment. As it would be expected that smaller acidic and basic particles and closer particle spacing should greatly improve the rate of ion-exchange, attempts have been made to produce amphoteric resins having both acidic and basic sites on the one polymeric network; but, although their ion-exchange rates can be high, such polymers normally have a thermally regenerable ion-exchange capacity of no more than a few percent of the chemically regenerable total capacity and certainly below 0.2 meq/g, which renders them quite impractical for water demineralization. The reason for the low thermally regenerable ion-exchange capacity has been ascribed to the acidic and basic sites being in too close proximity, enabling the acidic and basic groups in the polymer to interact so that internal neutralization occurs, thus decreasing the number of acidic and basic groups available for ion-exchange.

One attempt to avoid this problem is the use of a particulate amphoteric ion-exchange resin in which minute but discrete particles of weakly basic and weakly acidic ion-exchange resins are incorporated in an ion-permeable matrix. Though the ion-exchange rates of such "plum-pudding" resins are inferior to amphoteric polymers in which both sites are present on the one macromolecule, the thermally regenerable capacities are superior, and the overall kinetics are much better than those of a conventional mixed bed. "Plum-pudding" resins, however, have much lower capacities than a mixed-bed because of the considerable quantity of inert material which is present as the ion-permeable binder.

We have now found a method of preparing amphoteric composite resins devoid of a third phase or matrix in which the self neutralization of the acidic and basic groups is substantially reduced so that increased ion-exchange capacities are achieved.

Accordingly we provide a process of manufacturing an amphoteric composite resin which process comprises first polymerizing a dispersion comprising two liquid phases wherein the first liquid phase comprises at least one monomer containing a basic group or a precursor or derivative thereof and a crosslinking agent, and the second liquid phase comprises at least one monomer containing an acidic group or a precursor or derivative thereof and a crosslinking agent, and wherein the monomers are not of opposite charge, the two liquid phases are substantially immiscible and partitioning of the monomers from one liquid phase to the other is minimal, to form a composite polymeric material; and second treating the composite polymeric material to convert any acidic group precursor or derivative and any basic group precursor or derivative to the free acid and free base respectively to form an amphoteric composite resin.

The composite resins obtained by the process of our invention comprise essentially two distinct crosslinked polymers. The preferred composite resin comprises the crosslinked polymer containing the basic ion-exchange group dispersed as domains within a matrix of the crosslinked polymer containing the acidic ion-exchange groups. However, composite resins with the inversion of this arrangement in which acidic domains are dispersed within a basic matrix also have acceptable thermally regenerable ion-exchange properties. In the polymerization process grafting across the phase boundary will occur to some extent and this is desirable as it imparts improved mechanical strength to the composite resins.

Each of the two liquid phases may also comprise one or more solvents and if solid monomers are employed the use of solvents may be necessary. However, the requirements remain that the two liquid phases be substantially immiscible and in particular that the partitioning of the monomers from one liquid phase to the other be minimal. Ideally the crosslinked polymer which comprises the matrix should have as much porosity as is compatible with adequate mechanical strength. This may be achieved by employing as a porogen a solvent in which the monomer is soluble but which is a good precipitant for the polymer.

To achieve adequate dispersion of one liquid phase within the other it may be necessary to use stabilizers. The stabilizers may be dissolved in either or both of the liquid phases. The choice of the dispersion stabilizer is not narrowly critical; certain surfactants used in dispersion polymerization, for example, hydrocarbon soluble non-ionic surface active agents as well as cellulose ethers, polyvinylalcohols, and polyacrylamides can be used. Solid dispersants such as calcium carbonate, magnesium stearate, colloidal silica and talc may be used. Stable emulsions may also be prepared using the so-called "comb" polydispersants and other polymeric dispersants such as those made by copolymerizing mixtures of hydrophilic and hydrophobic monomers. Ionic surface active agents may also be employed, but it is desirable that they be degradable so that they can be readily converted to non-ionic compounds in order to avoid their being strongly adsorbed at the ion-exchange sites and fouling the final amphoteric composite resin product. Preferably, the ionic surface active agents should be degradable to non-ionic compounds under the conditions used to unblock the ion-exchange sites in the resin. Suitable materials are sulphated hydroxypolyethers, quaternary ammonium compounds such as cetyltrimethylammonium bromide and quaternized ethoxylated fatty amines which degrade under the alkaline conditions normally employed for unblocking the ion-exchange sites on the resin.

The monomers chosen for the preparation of the resins in accordance with the present invention may be, typically, those known in the art to be suitable for the production of ion-exchange resins or organic derivatives thereof. The basic sites may, for example, be derived from any weakly basic monomers, such as substituted amines, preferably ethylenically substituted amines such as allylamines and especially diallylamines, N-lower alkyl diallylamines, N-benzyldiallylamine and triallylamine; similarly, acidic sites may be those derived from unsaturated carboxylic acid containing monomers such as acrylic acid and methacrylic acid. Other monomers which are suitable for resins of this type include basic monomers such as N-alkylethyleneimines, dimethylaminoethyl methacrylate, t-butylaminoethyl methacrylate, N,N-dialkylaminomethylstyrenes, and acidic monomers such as ethacrylic acid, maleic acid, vinylacetic acid, allylacetic acid, maleamic acid, N-alkylmaleamic acids, N-arylmaleamic acids, itaconic acid, fumaric acid, glutaconic acid and the like.

Suitable organic derivatives of the monomers which will act as non-charged or like-charged precursors for the ion-exchange sites include, in the case of basic groups, amides of primary or secondary ethylenically substituted amines, such as N-acetyl-N,N-diallylamine and the like. A suitable precursor for tertiary amino groups would be products formed by the reaction of the amine with a halogenated acid, as for example in the reaction of triallylamine with 3-chlorobutyric acid. A suitable precursor for primary amino groups is the nitrile, such as acrylonitrile, methacrylonitrile, vinylacetonitrile, allylacetonitrile, maleonitrile and the like.

Precursors for acidic groups include esters, acyl halides, amides, imides, nitriles, acid anhydrides and aminoesters, such as the methyl and other non-charged esters of acrylic, methacrylic, ethacrylic, vinylacetic, allylacetic, maleic, maleamic, itaconic, glutaconic and fumaric acids, the amides, imides, nitriles, acid anhydrides and aminoethyl, N-alkylaminoethyl or N,N-dialkylaminoethyl esters of the aforementioned acids.

Preferred organic derivatives of the monomers yielding acid sites are the lower alkyl esters and amides of acrylic and methacrylic acid.

The nature of the allylamine if present is not narrowly critical and the composition of our invention may be prepared using any amine having one or more allyl substituents. Suitable allylamines include, for example, allylamine, diallylamine, triallylamine and alkyldiallylamines. Other suitable allylamines include compounds of the general formula I:

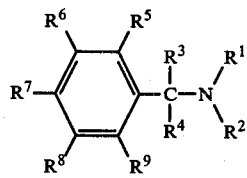

wherein $R^1$ is an allyl group; $R^2$ is either a hydrogen atom or an alkyl or substituted alkyl group, which group being either saturated or olefinically unsaturated; $R^3$, $R^4$, $R^5$, $R^6$, $R^7$, $R^8$ and $R^9$ separately, is a hydrogen or halogen atom or an alkyl, substituted alkyl, aryl, substituted aryl, nitro, dialkylamino alkyl group or

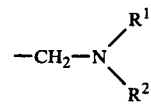

except that not more than two of $R^3$, $R^4$, $R^5$, $R^6$, $R^7$, $R^8$ and $R^9$ may be the group

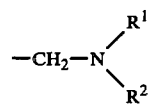

and except that not more than six of $R^3$, $R^4$, $R^5$, $R^6$, $R^7$, $R^8$ and $R^9$ may be hydrogen.

Preferably the olefinically unsaturated group is allyl. A preferred class of compounds of general formula I as defined hereinbefore consists of compounds of general formula II:

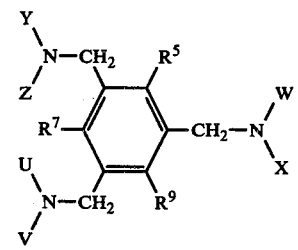

wherein $R^5$, $R^7$ and $R^9$ are as defined hereinabove and U, V, W, X, Y and Z are allyl. A further preferred class of compounds of general formula I as defined hereinbefore consists of compounds of general formula III.

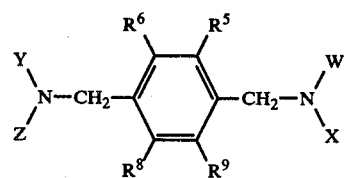

wherein $R^5$, $R^6$, $R^8$ and $R^9$ are as defined hereinabove and W, X, Y and Z are allyl.

Other suitable allylamines include, for example, amines of the general formula IV:

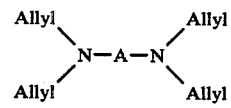

where A is an alkylene group containing 2 to 8, preferably 5 to 7 inclusive carbon atoms, for example, 1,6-bis(N,N-diallylamino) hexane.

Preferred monomers yielding base sites for use in the preparation of ion exchange resins suitable for use in a thermal regeneration process include, for example: triallylamine, methyldiallylamine, ethyldiallylamine, 1,4-bis (N,N-diallylaminomethyl)benzene, 2,4,6-tris(N,N-diallylaminomethyl)toluene, 1,2,4-tris(N,N-diallylaminomethyl) benzene, 1,6-bis(N,N-diallylamino)-hexane, n-propyldiallylamine and benzyldiallylamine.

Suitable crosslinking agents for the polymerization of the monomer yielding the acid sites include, for example, ethyleneglycol dimethacrylate, 1,3-butyleneglycol dimethacrylate, trimethylolpropane trimethacrylate, divinylbenzene, triallylcyanurate, the triallyl ether of pentaerythritol, methylene-bis-acrylamide and the like.

Suitable crosslinking agents for the polymerization of the monomer yielding the base sites include triallylamine and diallylamines, for example, 1,4-bis(N,N-diallylaminomethyl)benzene, 2,4,6-tris(N,N-diallylaminomethyl)toluene, 1,2,4-tris(N,N-diallylaminomethyl)benzene, 1,6-bis(N,N-diallylamino)-hexane and the like.

The amount of crosslinking agent present is not narrowly critical but we have found that resins for use in a thermal regeneration process may be prepared by polymerizing mixtures wherein the crosslinking agents are present in each phase in an amount from 0–70% w/w of the composite polymer and preferably from 10–50% w/w.

Those skilled in the art will understand that allylamines must normally be present as salts in order to be polymerized. Hence, all references in this specification to the polymerization of allylamines, even when not specifically described as salts, are to the amines in their polymerizable form.

Suitable salts are the salts of allylamines with strong inorganic acids such as, for example, hydrochloric, sulphuric, nitric or phosphoric acid and organic carboxylic acids such as, for example, the $C_1$ to $C_{10}$ alkane carboxylic acids. Generally speaking, the pH, temperature and other conditions associated with the polymerization process may be those known in the art for the polymerization of the appropriate monomers concerned.

The nature of the polymerization initiator is not critical. However, if chemical initiation is employed it is desirable to use two initiators, one dissolved in each liquid phase. In a polar liquid phase water soluble initiators such as, for example, potassium persulphate, alpha, alpha$^1$-azo-bis-beta-cyanoisovaleric acid, alpha, alpha$^1$-azo-bis-iso-butyramidinium hydrochloride and cumene hydroperoxide, and redox systems such as, for example $K_2S_2O_8/K_2S_2O_5$ and cumene hydroperoxide/$FeSO_4$ may be employed. For a non-polar liquid phase initiators such as alpha, alpha$^1$-azo-bis-isobutyronitrile, cetyl peroxide carbonate, lauryl peroxide, t-butyl perpivalate, t-butylcyclohexyl peroxydicarbonate, azo-bis-dimethylvaleronitrile, benzoyl peroxide and organic soluble analogues thereof may be employed.

It is possible to use irradiation as the initiator. Irradiation can be used to initiate the polymerization of all the allylamines of general formula I in the form of salts.

Accordingly in one aspect of our invention we provide a process of manufacturing polymeric compounds, said process comprising exposing the mixture as defined hereinbefore to high energy radiation at a temperature of between −80° and 120° C. and isolating the polymeric composite so formed. By high energy radiation we mean radiation having a wavelength of less than 10 nanometers, in particular gamma- and beta-rays derived from isotopes or in the form of fast electrons such as produced by a Van de Graaff generator and an electron accelerator. Other sources of ionizing or high energy radiation are known in the art, e.g. from British Pat. No. 801,528, page 1, lines 49–56; these include neutrons, accelerated heavy particles and X-rays or mixtures of them. A convenient practical source of high energy radiation is a Cobalt 60 source.

The dose rate of irradiation controls the rate of initiation of the polymerization, but has little effect on the properties of the polymer formed. Dose rates between 10 rad/hr and 5 megarad/hr are operative and rates between 20,000 rad/hr and 1 megarad/hr are convenient in practice. However, the total dose delivered to the polymerization mixture affects the yield as well as the physical properties of the polymer produced. Doses from 1 megarad up to 20 megarad are operative; optimum yield of polymer is usually achieved at 1 to 10 megarad.

Radiation, usually and preferably, is carried out in an inert atmosphere such as nitrogen or argon. The presence of air does not stop the polymerization, but a reduction in yield and capacity is observed.

In a further aspect of our invention we provide a process of manufacturing polymeric compounds, said process comprising exposing the mixture as defined hereinbefore to electromagnetic radiation having a wavelength greater than 180 nanometers and preferably less than 800 nanometers and isolating the polymeric composite so formed.

The source of electromagnetic radiation is not critical. Preferably the electromagnetic radiation has a reasonably narrow wavelength range. Suitable sources of radiation are for example sunlight or a low pressure mercury lamp. In a further embodiment of our invention the source of radiation may be a laser beam of suitable wavelength.

A sensitizer may be used in conjugation with the electromagnetic radiation in which case it is desirable to use two sensitizers, one dissolved in each liquid phase. By sensitizer we mean a compound capable of absorbing the electromagnetic radiation and initiating the polymerization reaction. Suitable sensitizers are known to those skilled in the art for electromagnetic radiation of any given wavelength. Thus for example it is well known to those skilled in the art that ketones such as for example acetone are suitable sensitizers for electromagnetic radiation of wavelength in the regions 200–300 nanometers and that certain natural products such as for example riboflavin are suitable sensitizers for sunlight. Benzoin and alpha-methylbenzoin, and unsubstituted or substituted benzoin aryl or lower alkyl ethers wherein the alkyl group contains from 1 to 4 carbon atoms e.g. benzoin methyl ether, allylbenzoin methyl ether, and methylbenzoin methyl ether are active sensitizers between 300 and 400 nm. Above 360 nm riboflavin and chloranil are effective. Other compounds such as azo-bis-isobutyronitrile are also effective.

In certain cases it is advantageous to combine chemical initiation with radiation initiation. For example, it is possible to increase the degree of crosslinking of a polymer formed by chemical initiation if the polymer is further treated with high energy radiation.

For use as ion-exchange resins the composite resins of this invention must be produced within controlled particle size ranges. The particles of the required size range may be obtained by polymerization of the two phase system as hereinbefore described followed by grinding and sieving.

Particles of the composite resin can be prepared in the required size range in bead form by suspension polymerization using a tertiary liquid phase which need not include any reacting components, but which merely makes it possible to suspend the dispersion of the two liquid phases comprising the monomers in a supporting medium which is essentially immiscible with the two monomer containing liquid phases. In this way the product can be made in the form of particulate bead-like material having a particle size which makes it suitable for use in ion-exchange columns. The size of the beads thus formed depends on the concentration of stabilizers, the monomers and solvents employed, the stirring rate, the temperature and the geometry of the reaction vessel. Beads of size between 200 mesh BSS and 10 mesh BSS can easily be produced. A unique way of stabilizing the mixture of monomers is to carry out a brief prepolymerization before adding the mixture to the tertiary phase.

The choice of the supporting medium is not narrowly critical provided the insolubility requirements are satisfied. Suitable supporting media are concentrated solutions of inorganic salts which have the advantage that they will not dissolve non-polar reagents or solvents, the salt forms of amine monomers or carboxylic acids and their derivatives. When polar organic solvents such as dimethyl formamide, acetone, methylethyl ketone or the lower aliphatic alcohols are employed, a convenient supporting medium is a non-polar material such as, for example, petroleum ether, paraffin oils, aromatic hydrocarbons or chlorinated hydrocarbons.

The choice of stabilizer is not narrowly critical and will depend on the properties of the supporting medium and the suspended two phase dispersion. If stabilizers are used in the two phase dispersion comprising the monomers further stabilizers may not be required for suspension polymerization of the two phase dispersion. However, stabilizers or additional stabilizers may be required, and if so the surface active agents hereinbefore described for use in the stabilization of the two phase dispersion are suitable.

The choice of solvent system also has an influence on the pH which is chosen for the polymerization but, generally speaking, the polymerization pH will be found to lie between 3.5 and 6.8, although some combinations of monomers will require the polymerization pH to lie outside this range. To some extent, another factor influencing polymerization pH conditions is the choice of monomer ratios to give the required ratio of basic and acidic groups.

The composite polymer obtained from the polymerization of the dispersion of the two liquid phases comprising the monomers is treated to convert the organic derivative to the amphoteric composite polymer. Any reaction procedure known in the art may be employed which is capable of converting the blocking group to an ion-exchange site, but is not capable of destroying the polymer chain. Thus for example when an ester, amide, imide, nitrile or acid anhydride is used as the precursor, it may be hydrolyzed by treatment of the composite polymer with dilute aqueous acid or alkali. We prefer where possible to treat such a polymeric resin with aqueous caustic soda solution under reflux for several hours. This alkali treatment will also convert precursors formed from tertiary amines and chlorinated carboxylic acids to the original tertiary amino form. When a nitrile is used as the precursor for a basic group, hydrogenation or reduction to the primary amino form will be necessary.

Following polymerization and unblocking, it is preferable to subject the product resin — preferably in particulate form — to a pH equilibration treatment to achieve the optimum ion-exchange performance. Normally, this simply involves stirring the resin in an aqueous salt solution at room temperature (ca. 20° C.) and adding sodium hydroxide until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in our prior Australian Patent No. 274,029. For purposes of evaluation, however, the resin may be washed with hot water at ca. 80° C. to obtain it in a regenerated form, and the amount of salt taken up by stirring the regenerated resin in salt solution at room temperature used as a measure of the thermally regenerable capacity of the system. The time necessary to achieve salt uptake equivalent to 50% of the equilibrium level (the "half time") may be used as a convenient measure of the rate of salt adsorption.

Finally, it will be appreciated that the amphoteric composite resins formed in accordance with the present invention must differ from the prior art amphoteric resins where self-neutralization must involve association of oppositely charged sites which, from the steric or structural standpoint, defines a resin which is significantly different from one where self-neutralization has been minimized. However, while this difference in structure is difficult to define by chemical or physical analysis, a ready indicator is provided by the significantly increased thermally regenerable capacity.

The ion-exchange capacity of the product produced by our process depends to a great extent on the monomers used.

Suitable combinations of monomers to give a desired ion-exchange capacity may be found by simple experiment.

Thermally regenerable resins have a potentially important application in water demineralization processes because low-grade heat can be efficiently employed for regeneration and certain of these resins are of use in the desalination of water by a thermally regenerated process.

For use in thermal regeneration processes we prefer that the monomer containing a basic group or an organic noncharged or negatively charged derivative thereof, is an allylamine.

Polymeric compositions having suitable ion-exchange properties for desalination processes may be made by the process of our invention, followed by an unblocking stage if necessary, from mixtures comprising a molar ratio of allylamine salt to the acid or acid derivative in the range from 10:90 to 90 to 10 preferably from 40:60 to 80:20.

Resins of particular use in desalination processes may be prepared by polymerizing a dispersion comprising two liquid phases wherein the first liquid phase comprises monomers such as triallylamine or diallylamine and 1,6-bis(diallylamino)-hexane, and the second liquid phase comprises monomers such as a lower alkyl ester of acrylic acid and divinylbenzene.

Although a suitable amphoteric composite resin can be produced by the polymerization of a dispersion of two liquid phases the first comprising a crosslinking agent and one monomer containing a basic group or derivative thereof and the second comprising a crosslinking agent and one monomer containing an acidic groups or derivative thereof, the number of acid and base functional monomers employed need not be restricted to two. In certain instances it may be advantageous to have more than one acidic and one basic monomer or their precursors, so that three, four or even more monomers may be present in the polymerization mixture. A range of products may be prepared which are homofunctional in basic and acidic groups or homofunctional in only basic of acidic groups and heterofunctional in the other or heterofunctional in both types of groups.

We have found that in certain cases it is advantageous to add to the phase which is to form the matrix of the amphoteric composite resin an additional monomer which is not an ion-exchange group precursor and which preferably is non-charged. We believe that it acts to space the ion-exchange sites of the matrix of the amphoteric composite resin allowing sufficient matrix to contain the dispersed phase without changing the ratio of acidic to basic groups from its optimum value. Suitable neutral additional monomers are, for example, vinyl acetate, isobutyl vinyl ether, styrene, methyl methacrylate (which remains largely unhydrolyzed) and the like.

Composite polymers having useful ion-exchange properties may be made when the proportion of the additional monomer lies in the range from 0–70% w/w of the composite polymer and preferably 5–50% w/w. The additional monomer should be soluble in the phase which is to form the matrix of the amphoteric composite resin and essentially insoluble in liquid phase which is to form the domains dispersed within the matrix and must not be degraded by the treatment used to unblock the ion-exchange sites.

We have also found that particles of the composite resin can be prepared in the required size range in bead form by suspension polymerization of the dispersion of the two liquid phases comprising the monomers using a gas phase as supporting medium. For example the two liquid phases comprising the monomers may be polymerized by suspension in a gas phase at ambient or elevated temperature in a spray drier. The gas used as suspension medium may be air but preferably is an inert gas.

The invention is illustrated by, but by no means limited to, the following examples in which all parts are parts by weight unless otherwise specified.

EXAMPLE 1

An emulsion of methyl acrylate (MA) (6 ml), divinyl benzene (DVB) (0.3 ml), a mixture of Span 85 and Tween 85 (Registered Trade Marks) of HLB 3.8 (0.15 g), a 70% aqueous solution of triallylamine hydrochloride (TAA.HCl) (9 ml), alpha, alpha[1]-azo-bis-isobutyronitrile (AIBN) (0.15 g) and alpha, alpha[1]-azo-bis-isobutyramidinium hydrochloride (Amido) (0.15 g) was heated to 65° with stirring at 240 rpm until gelation occurred (about 1 hour) and then heated without stirring for a further 20 hours. After cooling, the rubbery mass was broken up and washed successively in a sintered glass funnel with acetone, 2N HCl, pH 3 HCl and acetone and dried in vacuo at 50° to give 7.92 g (66%) of a light yellow resin which was ground in a mortar and pestle and sieved. The fraction (6.35 g) of 36 to 12 mesh was heated with 5N KOH (50 ml) at 87° under nitrogen with slow stirring for 65 hours, cooled and washed successively in a sintered glass column with 0.3N NaOH, 2N HCl, pH 3 HCl and dried in vacuo at 50° to give 5.2 g (48%) of resin. The properties of the hydrolyzed resin are reported in Table 3.

EXAMPLES 2–45

The resins of the Examples were prepared following essentially the same procedure described in Example 1. Details of the dispersion stabilizer (surfactant), acid precursor phase and amine phase are given in Table I and details of the acid to amine molar ratio, method of initiation and reaction conditions are given in Table 2. The properties of the hydrolyzed resins are reported in Table 3.

EXAMPLE 46

A mixture of cetyl trimethylammonium bromide (CTAB) (0.3 g), MA (12 ml), DVB (1.2 ml), AIBN (0.3 g), Amido (0.17 g) and TAA.HCl (10 ml) was heated at 65° under a nitrogen atmosphere for 20 minutes and then an aliquot (4 ml) of this slurry added dropwise to a nitrogen-saturated slurry of paraffin oil (50 ml) and talc (1 g) at 77° with stirring at 150 rpm and heating continued for 20 hours. The cooled mixture was washed in a sintered glass funnel with hexane, dried and sieved to remove the talc. The product (2 g) was obtained as hard beads, 0.7 to 1.2 mm in diameter.

EXAMPLE 47

A mixture of CTAB (0.3 g), MA (12 ml), DVB (1.2 ml), AIBN (0.3 g), Amido (0.17 g) and TAA.HCl (10 ml) was heated at 68° under a nitrogen atmosphere for 20 minutes and then DVB (0.12 ml) added to a nitrogen-saturated slurry of paraffin oil (60 ml) and talc (1.2 g) at 79° with stirring at 200 rpm and heating continued for 20 hours. The cooled mixture was washed in a sintered glass funnel with hexane, dried and sieved to give a product (1.9 g) as hard beads, 0.25–1.6 mm in diameter. The product (1.9 g) was washed with 2N HCl and then hydrolyzed by heating at 88° for 48 hours with 5N KOH (20 ml) under nitrogen with slow stirring. The resulting resin was washed successively in a sintered glass column with 0.3N NaOH, 2N HCl, pH 3 HCl and dried in vacuo at 50° to give 1.2 g of resin. The amine capacity from microanalysis was 2.55 meq/g. The amine and acid capacities from titration were 1.56 meq/g and 1.61 meq/g, respectively (acid to base ratio = 1.03). The thermally regenerable capacity of the resin (equilibrated at pH 6.8) was 0.39 meq/g.

TABLE I

The Preparation of No-Matrix Resins By Polymerizing a Two-Phase Heterogeneous System

| Example No | Surfactant (g) | Acid Precursor Phase | | | | Solvent and/or Diluent (ml) | | Amine Phase | | | |
|---|---|---|---|---|---|---|---|---|---|---|---|
| | | Acid Precursor (ml) | | Crosslinker (ml) | | | | Amine (ml) | | Crosslinker (ml) | Solvent |
| 1 | S/T[a] | 0.15 | MA[b] | 6 | DVB[c] | 0.3 | — | TAA[e] | 9 | — | water |
| 2 | S/T | 0.05 | MA | 2 | DVB | 0.1 | — | TAA | 10 | — | water |
| 3 | S/T | 0.1 | MA | 4 | DVB | 0.2 | — | TAA | 10 | — | water |
| 4 | S/T | 0.1 | MA | 4 | DVB | 0.2 | CB[d] 3 | TAA | 10 | — | water |
| 5 | S/T | 0.1 | MA | 4 | DVB | 0.4 | CB 3 | TAA | 10 | — | water |
| 6 | S/T | 0.1 | MA | 4 | DVB | 0.8 | CB 3 | TAA | 10 | — | water |
| 7 | S/T | 0.1 | MA | 4 | DVB | 0.4 | Hexane 3 | TAA | 10 | — | water |
| 8 | S/T | 0.4 | MA | 4 | DVB | 0.4 | CB 3 | TAA | 10 | — | water |
| 9 | CTAB[f] | 0.6 | MA | 4 | DVB | 0.4 | CB 3 | TAA | 10 | — | water |

TABLE I-continued

The Preparation of No-Matrix Resins By Polymerizing a Two-Phase Heterogeneous System

| Example No | Surfactant (g) | Acid Precursor Phase ||||| Amine Phase |||Solvent |
|---|---|---|---|---|---|---|---|---|---|---|
| | | Acid Precursor (ml) || Crosslinker (ml) || Solvent and/or Diluent (ml) | Amine (ml) || Crosslinker (ml) || |
| 10 | CTAB 0.1 | MA | 4 | DVB | 0.4 | CB 3 | TAA | 10 | — | | water |
| 11 | CTAB 0.1 | MA | 4 | DVB | 0.4 | CB 3 | TAA | 10 | — | | water |
| 12 | S/T 0.18 | MA | 4 | EGDMA[i] | 0.4 | CB 3 | TAA | 10 | — | | water |
| 13 | 18M5 0.2 | MA | 4 | DVB | 0.4 | — | TAA | 10 | — | | water |
| 14 | S/T 0.2 | EA[g] | 4 | DVB | 0.4 | — | DAA[j] | 8 | HEXA[l] | 1.1 | water |
| 15 | CTAB 0.2 | EA | 4 | DVB | 0.4 | CB 3 | DAA | 8 | HEXA | 1.1 | water |
| 16 | S/T 0.2 | MA | 4 | DVB | 0.4 | — | DAA | 8 | HEXA | 1.1 | water |
| 17 | CTAB 0.2 | MA | 4 | DVB | 0.4 | CB 3 | DAA | 8 | HEXA | 1.1 | water |
| 18 | CTAB 0.2 | MA | 4 | DVB | 0.4 | CB 3 | MDAA[k] | 11 | HEXA | 1.1 | water |
| 19 | CTAB 0.25 | EA | 4.9 | DVB | 0.4 | CB 3 | MDAA | 11 | HEXA | 1.1 | water |
| 20 | CTAB 0.1 | EA | 4.9 | DVB | 0.4 | CB 3 | TAA | 10 | — | | water |
| 21 | CTAB 0.25 | BA[h] | 6.5 | DVB | 0.4 | CB 3 | MDAA | 11 | HEXA | 1.1 | water |
| 22 | S/T 0.6[n] | EA | 4.9 | DVB | 0.4 | CB 3 | DAA | 8 | HEXA | 1.1 | water |
| 23 | CTAB 0.1 | MA | 4 | DVB | 0.4 | CB 3 | TAA | 10 | — | | water |
| 24 | CTAB 1.5 | MA | 60 | DVB | 6 | CB 45 | TAA | 150 | — | | water |
| 25 | CTAB 1.5 | MA | 60 | DVB | 6 | CB 45 | TAA | 150 | — | | water |
| 26 | S/T 1.5 | MA | 60 | DVB | 6 | CB 45 | TAA | 150 | — | | water |
| 27 | CTAB 3.0 | EA | 60 | DVB | 6 | CB 45 | DAA | 120 | HEXA | 16.5 | water |
| 28 | CTAB 3.0 | EA | 60 | DVB | 6 | CB 45 | DAA | 120 | HEXA | 16.5 | water |
| 29 | CTAB 3.0 | EA | 60 | DVB | 6 | CB 45 | DAA | 120 | HEXA | 16.5 | water |
| 30 | CTAB 0.25 | EA | 4.9 | DVB | 0.4 | CB | 2.8 + V[o] 0.2 | MDAA | 11 | HEXA | 1.1 | water |
| 31 | CTAB 0.25 | EA | 4.9 | DVB | 0.4 | CB | 2.55 + V 0.45 | MDAA | 11 | HEXA | 1.1 | water |
| 32 | CTAB 0.25 | EA | 4.9 | DVB | 0.4 | CB | 2 + V 1 | MDAA | 11 | HEXA | 1.1 | water |
| 33 | CTAB 0.25 | EA | 4.9 | DVB | 0.4 | CB | 2.8 + M[p] 0.2 | MDAA | 11 | HEXA | 1.1 | water |
| 34 | CTAB 0.25 | EA | 4.9 | DVB | 0.4 | CB | 2.55 + M 0.45 | MDAA | 11 | HEXA | 1.1 | water |
| 35 | CTAB 0.25 | EA | 4.9 | DVB | 0.4 | CB | 2 + M 1 | MDAA | 11 | HEXA | 1.1 | water |
| 36 | CTAB 0.25 | EA | 4.9 | DVB | 0.4 | CB | 2.8 + V 0.2 | DAA | 8.6 | HEXA | 1.1 | water |
| 37 | CTAB 0.25 | EA | 4.9 | DVB | 0.4 | CB | 2.55 + V 0.45 | DAA | 8.6 | HEXA | 1.1 | water |
| 38 | CTAB 0.25 | EA | 4.9 | DVB | 0.4 | CB | 2 + V 1 | DAA | 8.6 | HEXA | 1.1 | water |
| 39 | CTAB 0.25 | EA | 4.9 | DVB | 0.4 | CB | 2.8 + M 0.2 | DAA | 8.6 | HEXA | 1.1 | water |
| 40 | CTAB 0.25 | EA | 4.9 | DVB | 0.4 | CB | 2.55 + M 0.45 | DAA | 8.6 | HEXA | 1.1 | water |
| 41 | CTAB 0.25 | EA | 4.9 | DVB | 0.4 | CB | 2 + M 1 | DAA | 8.6 | HEXA | 1.1 | water |
| 42 | S/T 0.3 | AAm[q] | 1.77 | MBAAm[r] | 0.18 | water 2 | TH[s] | 7.4 | — | | — |
| 43 | CTAB 0.3 | AAm | 1.77 | MBAAm | 0.18 | water 2 | TH | 7.4 | — | | — |
| 44 | S/T 0.3 | AAm | 1.77 | MBAAm | 0.18 | water 2 | TE[t] | 8.2 | — | | — |
| 45 | CTAB 0.3 | AAm | 1.77 | MBAAm | 0.18 | water 2 | TE | 8.2 | — | | — |

[a] Span 85 + Tween 85 (Registered Trade Marks), HLB 3.8
[b] MA = methyl acrylate
[c] DVB = divinylbenzene as a 55% solution of DVB
[d] CB = chlorobenzene
[e] TAA = 70% aqueous solution of triallylamine hydrochloride
[f] CTAB = cetyltrimethylammonium bromide
[g] EA = ethyl acrylate
[h] BA = n-butyl acrylate
[i] EGDMA = ethylene glycol dimethacrylate
[j] DAA 67% aqueous solution of diallylamine hydrochloride
[k] MDAA = 53% aqueous solution of methyldiallylamine hydrochloride
[l] HEXA = 67% aqueous solution of 1,6-bis(N,N-diallylamino)hexane dihydrochloride
[n] plus Aerosil 2000 (Registered Trade Mark)
[o] V = vinyl acetate
[p] M = methyl methacrylate
[q] AAm = acrylamide
[r] MBAAm = methylene-bis-acrylamide
[s] TH = triallylamine salt of hexoic acid
[t] TE = triallylamine salt of 2-ethyl hexoic acid

TABLE 2

The Preparation of No-Matrix Resins By Polymerizing a Two-Phase Heterogeneous System

| EXAMPLE NO | POTENTIAL ACID TO AMINE RATIO | INITIATORS (g) (g) | CONDITIONS |
|---|---|---|---|
| 1 | 1.7 | AIBN (0.15) + Amido (0.15) | 65°/21 hr |
| 2 | 0.56 | AIBN (0.05) + Amido (0.17) | 65°/21 hr |
| 3 | 1.1 | AIBN (0.1) + Amido (0.17) | 65°/21 hr |
| 4 | 1.1 | AIBN (0.1) + Amido (0.17) | 65°/21 hr |
| 5 | 1.1 | AIBN (0.1) + Amido (0.17) | 65°/21 hr |
| 6 | 1.1 | AIBN (0.1) + Amido (0.17) | 65°/21 hr |
| 7 | 1.1 | AIBN (0.1) + Amido (0.17) | 65°/21 hr |
| 8 | 1.1 | AIBN (0.1) + Amido (0.17) | 65°/21 hr |
| 9 | 1.1 | AIBN (0.1) + Amido (0.17) | 65°/21 hr |
| 10 | 1.1 | AIBN (0.1) + Amido (0.17) | 65°/21 hr |
| 11 | 1.1 | AIBN (0.1) + Amido (0.17)[m] | UV at 25°/ 3 hr, 65°/ 21 hr |
| 12 | 1.1 | AIBN (0.1) + Amido (0.17) | 65°/21 hr |
| 13 | 1.1 | AIBN (0.1) + Amido (0.17) | 65°/21 hr |
| 14 | 0.87 | AIBN (0.1) + Amido (0.24) | 75°/21 hr |
| 15 | 0.87 | AIBN (0.1) + Amido (0.24) | 75°/21 hr |
| 16 | 1.1 | AIBN (0.1) + Amido (0.24) | 65°/21 hr |
| 17 | 1.1 | AIBN (0.1) + Amido (0.24) | 65°/21 hr |
| 18 | 1.1 | AIBN (0.1) + Amido (0.24) | 65°/21 hr |
| 19 | 1.1 | AIBN (0.1) + Amido (0.24) | 65°/21 hr |
| 20 | 1.1 | AIBN (0.1) + Amido (0.17) | 65°/21 hr |

TABLE 2-continued

The Preparation of No-Matrix Resins By Polymerizing a Two-Phase Heterogeneous System

| EXAMPLE NO | POTENTIAL ACID TO AMINE RATIO | INITIATORS (g) | (g) | CONDITIONS |
|---|---|---|---|---|
| 21 | 1.1 | AIBN (0.1) + Amido (0.24) | | 65°/21 hr |
| 22 | 1.1 | AIBN (0.15) + Amido (0.36) | | 65°/21 hr |
| 23 | 1.1 | $Co^{60}$ irradiation | | Dose 1.2 Mrad |
| 24 | 1.1 | $Co^{60}$ irradiation | | Dose 9.9 Mrad |
| 25 | 1.1 | $Co^{60}$ irradiation | | Dose 9.9 Mrad |
| 26 | 1.1 | $Co^{60}$ irradiation | | Dose 9.9 Mrad |
| 27 | 0.87 | $Co^{60}$ irradiation | | Dose 1.6 Mrad |
| 28 | 0.87 | $Co^{60}$ irradiation | | Dose 3.9 Mrad |
| 29 | 0.87 | $Co^{60}$ irradiation | | Dose 9.5 Mrad |
| 30 | 1.1 | AIBN (0.1) + Amido (0.24) | | 65°/21 hr |
| 31 | 1.1 | AIBN (0.1) + Amido (0.24) | | 65°/21 hr |
| 32 | 1.1 | AIBN (0.1) + Amido (0.24) | | 65°/21 hr |
| 33 | 1.1 | AIBN (0.1) + Amido (0.24) | | 65°/21 hr |
| 34 | 1.1 | AIBN (0.1) + Amido (0.24) | | 65°/21 hr |
| 35 | 1.1 | AIBN (0.1) + Amido (0.24) | | 65°/21 hr |
| 36 | 1.1 | AIBN (0.1) + Amido (0.24) | | 65°/21 hr |
| 37 | 1.1 | AIBN (0.1) + Amido (0.24) | | 65°/21 hr |
| 38 | 1.1 | AIBN (0.1) + Amido (0.24) | | 65°/21 hr |
| 39 | 1.1 | AIBN (0.1) + Amido (0.24) | | 65°/21 hr |
| 40 | 1.1 | AIBN (0.1) + Amido (0.24) | | 65°/21 hr |
| 41 | 1.1 | AIBN (0.1) + Amido (0.24) | | 65°/21 hr |
| 42 | 1.0 | AIBN (0.15) + Amido (0.05) | | 70°/21 hr |
| 43 | 1.0 | AIBN (0.15) + Amido (0.05) | | 70°/21 hr |
| 44 | 1.0 | AIBN (0.15) + Amido (0.05) | | 70°/21 hr |
| 45 | 1.0 | AIBN (0.15) + Amido (0.05) | | 70°/21 hr |

$^m$methyl benzoin methyl ether also added

TABLE 3

The Properties of No-Matrix Resins Obtained By Polymerizing a Two-Phase Heterogeneous System

| Example No | Yield of Resin Before Hydrolysis (%) | Time of Hydrolysis With 5N KOH at 87° (hrs) | Yield % | Yield of Mesh Size 12–36 (%) | Amine Capacity From Micro-Analysis (meq/g) | Amine (meq/g) | Acid (meq/g) | Acid to Amine Ratio | Thermally Regenerable Capacity$^b$ pH$^c$ | (meq/g) |
|---|---|---|---|---|---|---|---|---|---|---|
| 1 | 66 | 65 | 58 | 48 | 2.70 | 1.44 | 6.0 | 4.16 | 6.8 | 0.0 |
| 2 | 59 | 65 | 54 | 48 | 4.13 | 2.97 | 2.86 | 0.96 | 6.8 | 0.30 |
| 3 | 68 | 65 | 61 | 51 | 3.34 | 1.94 | 4.89 | 2.5 | 6.8 | 0.20 |
| 4 | 70 | 48 | 59 | 52 | 3.24 | 1.97 | 4.47 | 2.27 | 6.8 | 0.19 |
| 5 | 78 | 48 | 68 | 51 | 3.51 | 2.61 | 3.61 | 1.38 | 6.8 | 0.44 |
| 6 | 76 | 40 | 69 | 50 | 3.14 | 1.89 | 3.83 | 2.03 | 6.8 | 0.29 |
| 7 | 80 | 40 | 68 | 50 | 3.04 | 2.0 | 4.33 | 2.16 | 6.8 | 0.22 |
| 8 | 82 | 40 | 69 | 53 | 3.21 | 1.89 | 4.05 | 2.14 | 6.8 | 0.28 |
| 9 | 79 | 48 | 66 | 57 | 3.56 | 1.47 | 4.36 | 2.97 | 6.8 | 0.22 |
| 10 | 75 | 48 | 67 | 57 | 3.64 | 1.61 | 4.44 | 2.76 | 6.8 | 0.29 |
| 11 | 70 | 48 | 61 | 51 | 3.19 | 1.72 | 4.72 | 2.74 | 6.8 | 0.15 |
| 12 | 75 | 48 | 64 | 58 | 3.38 | 2.17 | 4.27 | 1.97 | 6.8 | 0.07 |
| 13 | 66 | 48 | 53 | 45 | 4.16 | 2.00 | 4.50 | 2.25 | 7.7 | 0.46 |
| 14 | 66 | 48 | 53 | 45 | 4.16 | 2.00 | 4.50 | 2.25 | 7.7 | 0.46 |
| 15 | 75 | 48 | 63 | 44 | 4.30 | 2.86 | 3.81 | 1.33 | 7.7 | 0.78 |
| 16 | 61 | 48 | 53 | 45 | 3.31 | 1.39 | 5.05 | 3.63 | 7.7 | 0.17 |
| 17 | 75 | 48 | 65 | 54 | 3.59 | 2.94 | 3.78 | 1.28 | 7.7 | 0.31 |
| 18 | 69 | 48 | 58 | 51 | 3.53 | 2.00 | 4.89 | 2.44 | 7.4 | 0.03 |
| 19 | 68 | 48 | 59 | 50 | 3.30 | 2.30 | 3.59 | 1.56 | 7.4 | 0.94 |
| 20 | 79 | 65 | 71 | 50 | 3.49 | 1.02 | 3.68 | 3.6 | 6.8 | 0.76 |
| 21 | 76 | 65 | 70 | 50 | 3.66 | 2.0 | 3.3 | 1.65 | 7.4 | 1.17 |
| 22 | 75 | 48 | 58 | d | 4.43 | 1.24 | 2.94 | 2.37 | 7.7 | 0.56 |
| 23 | d | 48 | 16 | d | 3.0 | 1.94 | 0.73 | 0.37 | — | d |
| 24 | 88 | 48 | 79 | 59 | 3.74 | 2.56 | 3.38 | 1.32 | 6.8 | 0.53 |
| 25 | 90 | 48 | 78 | 65 | 3.76 | 2.89 | 3.73 | 1.29 | 6.8 | 0.55 |
| 26 | 94 | 48 | 81 | 60 | 3.66 | 2.67 | 3.55 | 1.33 | 6.8 | 0.72 |
| 27 | 19 | 48 | 19 | 18 | 0.16 | 0.06 | 2.83 | 47 | 7.7 | 0.0 |
| 28 | 51 | 48 | 42 | 24 | 2.38 | 0.91 | 7.22 | 7.9 | 7.7 | 0.08 |
| 29 | 81 | 48 | 70 | 41 | 3.94 | 2.76 | 4.61 | 1.67 | 7.7 | 1.05 |
| 30 | 80 | 48 | 74 | d | 3.63 | 3.44 | 1.06 | 0.31 | 7.4 | 0.21 |
| 31 | 89 | 48 | 77 | d | 3.56 | 3.50 | 2.50 | 0.74 | 7.4 | 0.79 |
| 32 | 76 | 48 | 68 | d | 3.69 | 3.45 | 1.0 | 0.29 | 7.4 | 0.12 |
| 33 | 88 | 48 | 78 | d | 3.74 | 3.16 | 4.61 | 1.46 | 7.4 | 1.47 |
| 34 | 80 | 48 | 63 | d | 4.13 | 3.34 | 1.18 | 0.35 | 7.4 | 0.96 |
| 35 | 73 | 48 | 56 | d | 3.71 | 1.31 | 3.14 | 2.4 | 7.4 | 0.75 |
| 36 | 70 | 48 | 67 | d | 3.97 | 1.21 | 3.49 | 2.88 | 7.7 | 0.88 |
| 37 | 85 | 48 | 78 | d | 3.74 | 1.45 | 2.95 | 2.03 | 7.7 | 0.0 |
| 38 | 52 | 48 | d | d | 2.67 | 1.12 | 6.03 | 5.4 | 7.7 | 0.38 |
| 39 | 80 | 48 | 72 | d | 3.02 | 2.30 | 5.10 | 2.22 | 7.7 | 0.73 |
| 40 | 79 | 48 | 66 | d | 3.32 | 1.1 | 2.95 | 2.68 | 7.7 | 0.49 |
| 41 | 93 | 48 | 85 | d | 2.70 | 0.57 | 3.63 | 6.4 | 7.7 | 0.18 |
| 42 | 56 | 48 | 45 | d | 5.84$^e$ | 2.05 | 2.60 | 1.27 | 6.8 | 0.22 |
| 43 | 51 | 48 | 44 | d | 5.85$^e$ | 0.65 | 2.85 | 4.38 | 6.8 | 0.24 |
| 44 | 52 | 48 | 43 | d | 6.89$^e$ | 1.55 | 3.05 | 1.97 | 6.8 | 0.37 |

TABLE 3-continued

The Properties of No-Matrix Resins Obtained By Polymerizing a Two-Phase Heterogeneous System

| | | Time of | | | Properties of Hydrolyzed Resin | | | | | |
|---|---|---|---|---|---|---|---|---|---|---|
| | Yield of Resin | Hydrolysis With | | Yield of Mesh | Amine Capacity | Capacity From Titration[a] | | | Thermally Regenerable Capacity[b] | |
| Example No | Before Hydrolysis (%) | 5N KOH at 87° (hrs) | Yield % | Size 12–36 (%) | From Micro-Analysis (meq/g) | Amine (meq/g) | Acid (meq/g) | Acid to Amine Ratio | pH[c] | (meq/g) |
| 45 | 61 | 48 | 44 | d | 6.67[e] | 1.97 | 3.78 | 1.92 | 6.8 | 0.34 |

[a]Determined by shaking a sample of resin with 0.1N NaOH for several days and then successively titrating an aliquot of the NaOH solution with 0.1N HCl and 0.05M AgNO₃.
[b,c]Measured on samples equilibrated at the given pH and regenerated at 80° with water.
[d]not determined.
[e]includes some unhydrolyzed amide.

EXAMPLE 48

A product (1.8 g) was obtained as beads, 0.25 to 1.6 mm in diameter, from CTAB (0.3 g), AIBN (0.15 g), Amido (0.54 g), MA (6 ml), DAA.HCl (12 ml — as a 67% aqueous solution), DVB (0.6 ml) and hexa.HCl (1.65 ml — as a 67% aqueous solution) by the method of Example 46 after washing successively with hexane, ethanol, 2N HCl, ethanol and drying. A sample (0.8 g) was hydrolyzed as detailed in Example 47, washed and dried to give a resin (0.55 g) with an amine capacity from microanalysis of 5.55 meq/g. The amine and acid capacities from titration were 4.0 meq/g and 1.22 meq/g, respectively (acid to base ratio = 0.30). The thermally regenerable capacity of the resin (equilibrated at pH 7.7) was 0.23 meq/g.

EXAMPLE 49

Example 48 was repeated with 1% Aerosil 200 (Registered Trade Mark) in paraffin oil used as the suspending medium to give a product (2.2 g) as hard beads.

We claim:

1. A process of manufacturing an amphoteric composite resin which process comprises first polymerizing a dispersion comprising two liquid phases wherein the first liquid phase comprises at least one monomer containing a basic group or a precursor or derivative thereof and a crosslinking agent, and the second liquid phase comprises at least one monomer containing an acidic group or a precursor or derivative thereof and a crosslinking agent, and wherein the monomers are not of opposite charge, the two liquid phases are substantially immiscible and partitioning of the monomers from one liquid phase to the other is minimal, to form a composite one liquid phase to the other is minimal, to form a composite polymeric material; and second treating the composite polymeric material to convert any acidic group precursor or derivative and any basic group precursor or derivative to the free acid and free base respectively to form an amphoteric composite resin.

2. A process according to claim 1 wherein the monomer containing a basic group or precursor or derivative thereof is chosen from the group consisting of allylamine, diallylamine, triallylamine, N-lower alkyl- or N-benzyl- N,N-diallylamine, 1,4-bis(N,N-diallylaminomethyl)benzene, 2,4,6-tris(N,N-diallylaminomethyl)toluene, 1,2,4-tris(N,N-diallylaminomethyl)-benzene, 1,6-bis(N,N-diallylamino)hexane, N,N-di-lower alkyl-N-(vinylbenzyl) amine, N-lower alkyl ethyleneimines, the t-butylamino-N-lower alkyl esters of acrylic, methacrylic and ethacrylic acid, the N,N-di-lower alkylaminomethyl and N,N-di-lower alkylaminoethyl esters of acrylic, methacrylic and ethacrylic acid, N-lower acyl-N,N-diallylamine, N-lower acyl-N-allylamine, acrylonitrile, methacrylonitrile, vinylacetonitrile, allylacetonitrile and maleonitrile; and the monomer containing an acidic group or precursor or derivative thereof is a free acid or a lower alkyl ester or a nitrile or an amide of a free acid chosen from the group consisting of acrylic acid, methacrylic acid, ethacrylic acid, maleic acid, vinylacetic acid, allylacetic acid, maleamic acid; N-lower alkyl maleamic acids, N-arylmaleamic acids, itaconic acid fumaric acid and glutaconic acid; and wherein lower alkyl and lower acyl mean, respectively, alkyl and acyl groups containing 1 to 6 carbon atoms.

3. A process according to claim 2 wherein the monomer containing a basic group is chosen from the group consisting of allylamine, diallylamine, triallylamine, N-lower alkyl- or N-benzyl-N,N-diallylamine, 1,4-bis(N,N-diallylaminomethyl)-benzene, 2,4,6-tris(N,N-diallylaminomethyl)toluene, 1,2,4-tris(N,N-diallylaminomethyl) benzene, 1,6-bis(N,N-diallylamino)-hexane, N,N- di- lower alkyl-N-(vinylbenzyl)amine; and the monomer containing an acidic group or precursor or derivative thereof is chosen from the group consisting of the lower alkyl esters and unsubstituted amides of acrylic acid, methacrylic acid, ethacrylic acid, vinylacetic acid and allylacetic acid.

4. A process according to claim 3 wherein the monomer containing a basic group is chosen from the group consisting of diallylamine, N-methyldiallylamine, N-ethyldiallylamine, N-n-propyldiallylamine, N-benzyldiallylamine, triallylamine, 1,4-bis(N,N-diallylaminomethyl)benzene, 2,4,6-tris(N,N-diallylaminomethyl) toluene, 1,2,4-tris(N,N-diallylaminomethyl benzene and 1,6-bis(N,N-diallylamino) hexane; and the monomer containing an acid group or precursor or derivative thereof is chosen from the group consisting of the $C_1$ to $C_6$ alkyl esters of acrylic acid and methacrylic acid, acrylamide and methacrylamide.

5. A process according to claim 1 wherein the crosslinking agent in the liquid phase comprising the monomer containing a basic group or a precursor or derivative thereof is chosen from the group consisting of triallylamine, 1,4-bis(N,N-diallylaminomethyl) benzene, 2,4,6-tris(N,N-diallylaminomethyl)toluene, 1,2,4-tris(N,N-diallylaminomethyl)benzene and 1,6-bis(N,N-diallylamino)hexane; and the crosslinking agent in the liquid phase comprising the monomer containing an acidic group or a precursor or derivative thereof is chosen from the group consisting of ethylene glycol dimethacrylate, 1,3-butyleneglycol dimethacrylate, trimethylolpropane trimethacrylate, divinylbenzene, triallylcyanurate, the triallyl ether of pentaerythritol and methylene-bis-acrylamide.

6. A process according to claim 1 wherein one or each liquid phase comprises as a porogen a solvent in which the monomer is soluble but which is a good precipitant for the polymer.

7. A process according to claim 1 wherein at least one dispersion stabilizer is used to stabilize the two phase dispersion.

8. A process according to claim 1 wherein one or both liquid phases comprise a monomer which is not a crosslinking agent and which does not contain a basic or an acidic group or a derivative or precursor of said group.

9. A process according to claim 1 wherein the composite resin is prepared in bead form by a suspension polymerization process in which the two phase dispersion of monomers is suspended in a tertiary liquid or gas phase which is essentially immiscible with either of the two liquid phases comprising the two phase dispersion of monomers, and the monomers are polymerized.

10. A process according to claim 9 wherein a dispersion stabilizer is used to stabilize the suspension of the two phase dispersion of monomers in a tertiary liquid phase.

11. A process according to claim 9 wherein the suspension of the two phase dispersion of monomers in a tertiary phase is stabilized by partial polymerization of the monomers before the addition of the two phase dispersion of monomers to the tertiary phase.

12. A process according to claim 1 wherein the molar ratio of basic groups or precursors or derivatives thereof to acidic groups or precursors or derivatives thereof is in the range from 10:90 to 90:10.

13. A process according to claim 12 wherein the basic group to acidic group molar ratio is in the range from 40:60 to 80:20.

14. A process according to claim 1 wherein the polymerization is initiated by one or more chemical initiators.

15. A process according to claim 14 wherein a different chemical initiator is used in each of the two liquid phases of the two phase dispersion of monomers.

16. A process according to claim 1 wherein the polymerization is initiated by high energy radiation having a wavelength of less than 10 nanometers.

17. A process according to claim 1 wherein the polymerization is initiated by ultraviolet or visible electromagnetic radiation of wavelength between 180 and 800 nanometers.

18. A process according to claim 1 wherein the polymerization is effected by a combination of chemical initiation and radiation initiation.

* * * * *